(12) United States Patent
Parkyn (10) Patent No.: US 8,789,983 B2
(45) Date of Patent: Jul. 29, 2014

(54) FREE-FORM CATADIOPTRIC ILLUMINATION LENS

(76) Inventor: William A. Parkyn, Lomita, CA (US)

(*) Notice: Subject to any disclaimer, the term of this patent is extended or adjusted under 35 U.S.C. 154(b) by 0 days.

(21) Appl. No.: 13/452,751

(22) Filed: Apr. 20, 2012

(65) Prior Publication Data

US 2012/0268949 A1    Oct. 25, 2012

Related U.S. Application Data

(60) Provisional application No. 61/478,458, filed on Apr. 22, 2011.

(51) Int. Cl.
*F21V 5/00* (2006.01)

(52) U.S. Cl.
CPC ........................... *F21V 5/00* (2013.01)
USPC ........................... 362/327; 362/326

(58) Field of Classification Search
CPC ............................................. F21V 5/00
USPC ............................................. 362/327
See application file for complete search history.

*Primary Examiner* — Mary Ellen Bowman
(74) *Attorney, Agent, or Firm* — Robert J. Lauson; Lauson & Tarver LLP (57) ABSTRACT

An illumination lens for hemispherically emitting light emitting diodes is disclosed that produces a square illumination pattern too narrow for a refractive lens to produce by itself. The lens is freeform in that it departs from circular symmetry in order to produce a square pattern. It is catadioptric in that it comprises a central refractive lens with a square output of desired angular width and a surrounding TIR prism that produces the same square output, overlapping the first for better uniformity of the sum. The central lens and circumambient TIR prism are joined in a monolithic configuration suitable for injection molding. Vector equations are disclosed for generating the shapes of the five optically active surfaces of the invention, two internal surfaces forming a central cavity surrounding the LED and three external surfaces, all five departing from circular symmetry.

17 Claims, 8 Drawing Sheets

FREE-FORM CATADIOPTRIC ILLUMINATION LENS

RELATED APPLICATION DATA

This application claims the priority date of provisional application No. 61/478,458 filed on Apr. 22, 2011, entitled "Free-Form Catadioptric Illumination Lens".

BACKGROUND

The latest high-power light-emitting diodes emit hundreds of lumens from a very small emission zone, only a few square millimeters. Although incandescent filament emits more lumens per square millimeter, their glass envelopes and spherical emission make them unsuitable for use with lenses. LEDs only have small encapsulating domes over them, and their hemispheric emission is much more amenable to being totally gathered by a lens. A characteristic common to nearly all illumination lenses of the prior art is rotational symmetry, due to the ease of mold fabrication by rotating machinery.

Round illumination patterns have been ubiquitous since the advent of the flashlight, not only because of fabrication restrictions but even more because of the large size of the source. The larger the light source the larger the luminaire must be to produce an illumination pattern with a sharply defined border. A square pattern necessarily requires a minimum degree of border sharpness, in that a corner is 41.4% farther out than an edge. Thus the initial circular pattern would need its edge to be no fuzzier than ±10% of its radius or it can't be turned into a square pattern. The laws of optics require than the luminaire aperture be much wider than the light source for any such sharpness to be attained. Thus only large specialty luminaire are commercially available to make square patterns from conventional light bulbs.

With the advent of the LED, its compactness provides a previously lacking ability to escape circular symmetry. This motivated the development of optical-theoretical means of delivering square or rectangular patterns from a circularly symmetric source. The prior art emphasizes wide-angle patterns of rectangular illumination, as in U.S. Pat. Nos. 5,924,788 and 7,674,019, both by Parkyn. In fact, the only way that preferred embodiments of the latter patent produce square beams narrower than ±45° is by discarding lateral rays beyond ±75°. This is because trying to bend light more than 30° with refraction alone results in disadvantageously thick lenses with excessive Fresnel reflectance and distortion.

Figure 1:
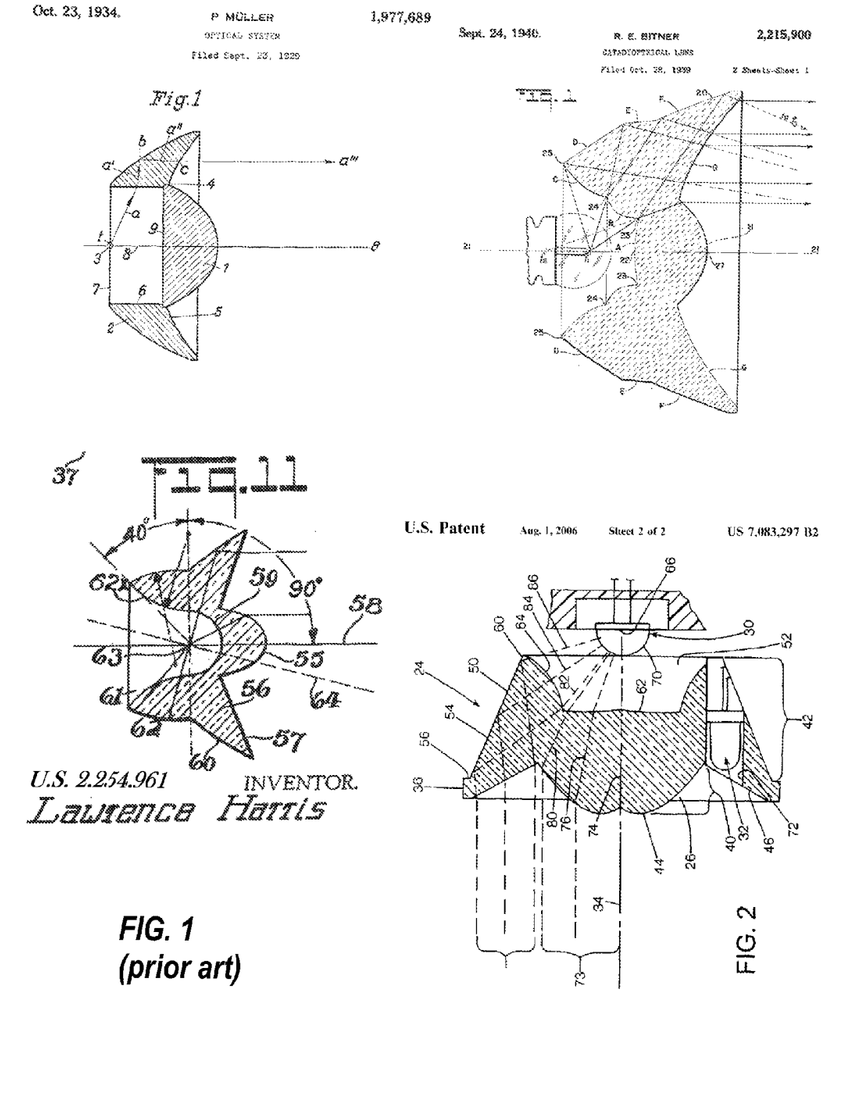
FIG. 1 shows some prior art.

When maximizing efficiency is a primary goal, a lens must completely surround the LED in order to collect all its light. Such a lens must collect the rays from the source that are nearly horizontal, and give them high deflection angles in order to send them toward the edge of a narrow-angle target. Refraction alone cannot deliver such high deflections, so that Total Internal Reflection (TIR) must be used. FIG. 1 shows some relevant prior art: U.S. Pat. No. 1,977,689 by Muller (1929) discloses the basic concept of an annular TIR prism surrounding a central refractive lens. U.S. Pat. No. 2,215,900 by Bitner (1940) discloses more complex profiles on the various surfaces. U.S. Pat. No. 2,254,961 by Harris (1941) discloses a conical top surface on the TIR prism. U.S. Pat. No. 7,083,297 by Matthews et al. (2006) discloses a conical TIR surface with a straight-line profile rather than the customary curved one. It was designed for a hemispherically emitting LED rather than a spherically emitting incandescent light bulb. Note that the LED is off-center, to form an automotive low beam, so that the profile of the central lens is an off-axis ellipse.

Other, less similar prior art is listed in the References, and like these four all are collimating, and all are circularly symmetric. What this prior art lacks is any capability of uniformly illuminating rectangular planar targets.

SUMMARY

The presently preferred embodiment alleviates this lack in the current art by providing compact optical embodiments, and methods of designing them, that when installed over LEDs produce square illumination patterns. These useful novelties are applicable to reading lamps and downlights, for which today's markets only have round output.

Preferred embodiments comprise a dual free-form lens that produces two completely overlapping square illumination patterns. A central free-form refractive lens intercepts about half the light from the central LED, typically out to an off-axis angle between 45° and 50°, depending upon the particular model of LED. Rays with wider angles out to 90° are intercepted by a free-form annular TIR prism that surrounds the central lens. Both lens and prism are given excess thickness so they can be joined into a single monolithic optical element, an illumination lens that has five optically active surfaces: the top surface of the central lens, the top surface of the TIR prism, the prism's lateral TIR surface, the prism's interior surface, laterally surrounding the LED, and the bottom surface of the central lens, covering the LED.

Another innovative aspect is a class of preferred embodiments wherein the two top surfaces are circularly symmetric top surfaces and the lateral TIR surface is developable (i.e., quasi-conical). These features reduce the cost of mold fabrication by allowing the top half of the mold to be simply made with a lathe, and the lateral mold surface to be made with a straight edge. The interior prism surface and the bottom surface of the central refractive lens are fully free-form, acting to make their illumination patterns square. These two interior surfaces join to form a central cavity surrounding the LED light source. The particular shape of each preferred embodiment varies according to the subtended angle of the square target to be illuminated. The narrower this angle, the larger the optical element must be if the square pattern is to be well defined, with sharp enough borders to be distinguishable from a round pattern. In practical terms the primary operating range of this preferred embodiment is square targets subtending ±20° to ±60°. Smaller angles may lead to objectionable overall size, while wider angles can be done with refraction only. Also, refraction-only lenses can produce ±50° if some source light is abandoned

BRIEF DESCRIPTION OF THE DRAWINGS

The above and other aspects, features and advantages of the preferred embodiments will be apparent from the following more particular description thereof, presented in conjunction with the following drawings wherein.

DETAILED DESCRIPTION OF THE PREFERRED EMBODIMENTS

A better understanding of the features and advantages of the presently preferred embodiments will be obtained by reference to the following detailed description and accompanying drawings, which set forth illustrative embodiments in which the principles of the preferred embodiment are utilized.

Figure 2:
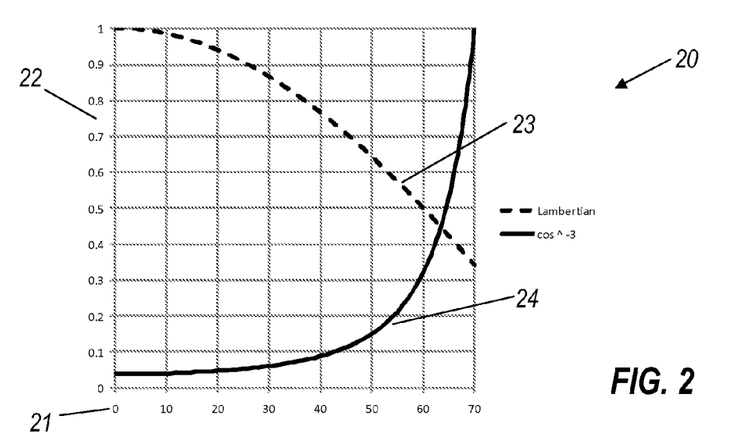
FIG. 2 graphs Lambertian intensity vs. that required for planar illumination.

Preferred embodiments comprise a central refraction-only lens and an annular TIR prism surrounding it. All those depicted herein are of the above-mentioned partially free-form class of lenses. Their design procedure begins by considering what is involved with producing rectangular illumination patterns. Uniform illumination of a plane requires that the luminaire intensity pattern follow a $\cos^{-3}$ profile. FIG. 2 shows graph 20, with abscissa 21 of off-axis angle to 70°, ordinate 22 of intensity relative to maximum. Dotted curve 23 is the cosine-dependent intensity of a Lambertian source, typical of an LED chip. Solid curve 24 is the $\cos^{-3}$ function relative to its value at 70°. This is the intensity output a luminaire must have to uniformly illuminate a plane subtending ±70°. It is quite different from the LED's raw output, as the two curves show.

The preferred embodiments disclosed herein produce a square illumination pattern through their free-form shape. If we suppose that we already have a lens that makes a round pattern of the desired width, then we can imagine modifying that lens to change the round pattern into a square one of the same width. Mild departures of the lens shape from circular symmetry suffice to expand a round distribution of LED light into a square output on the target.

Figure 3:
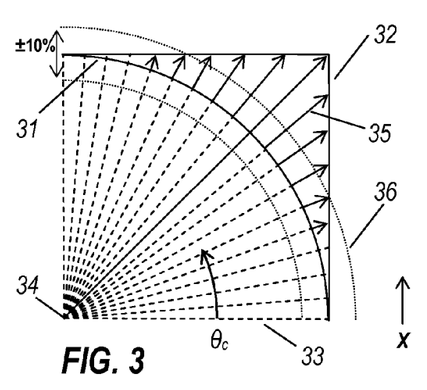
FIG. 3 shows the radial expansion involved in illuminating a square.

Producing a square illumination pattern from a uniform circular one has two components, radial and azimuthal. Firstly, uniform illumination of a planar square means that light going to the corners must be deflected further off-axis (41% more) than rays going to the middle of an edge. FIG. 3 is a quadrant diagram showing the radial expansion of circle 31 on the target plane into circumscribing square 32, with greatest spreading towards the corner (for clarity, only one quadrant is shown). Radial dashed lines 33 extend from center 34 to circle 31, each with its own uniformly spaced value of azimuth $\theta_c$. This uniform angular spacing is a consequence of the circle being uniformly illuminated. Radial arrows 35 extend outward from circle 31 to square 32. They indicate how much the dashed radii 33 must be stretched to fill square 32. Dotted circles 36 are 10% larger and smaller than circle 31. They indicate the effect of the finite source-size relative to the size of the luminaire. Such blurring greatly diminishes the 'squareness' of 32, so that an illumination lens has a minimum size requirement to keep blurring modest.

Figure 4:
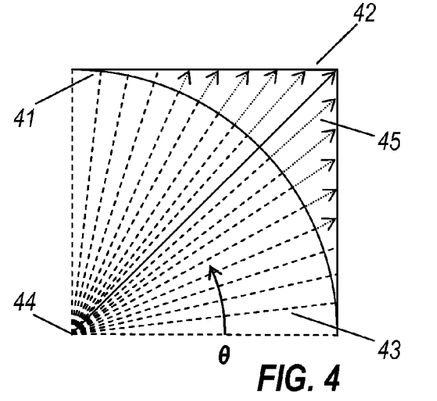
FIG. 4 shows the azimuthal redistribution of flux towards a diagonal.

In all a free-form lens did was spread the light radially, as indicated by arrows 35 of FIG. 3, the illuminance along each radius would be accordingly reduced as the flux is radially spread out. As a result there would be four dark 'spokes' on the diagonals, with illuminance reduced thereupon to $\sqrt{1/2}$=71%. To prevent this, the lenses of the present invention also spread light azimuthally, towards the diagonals and away from what hereinafter will be termed the coordinate axes, or simply axes (and axial). FIG. 4 is a further quadrant diagram, with circle 41 and circumscribed square 42. Dashed lines 43 radiate from centre 44, each with its own value of azimuth $\theta_s$. Dotted arrows 45 extend from circle 41 to square 42. Their angular spacing decreases toward the diagonal, denoting how flux must be redistributed to uniformly illuminate the square. The tips of arrows 45 can be seen to be uniformly spaced along square 42 at distances $\tan\theta_s$.

Figure 5:
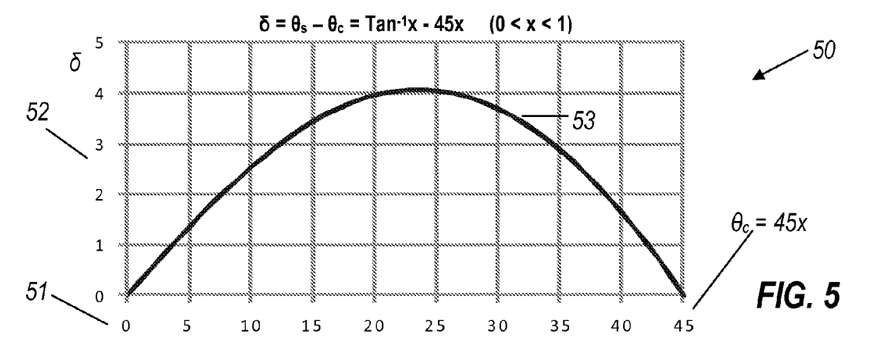
FIG. 5 is a graph of the required azimuthal deflections.

Morphing a uniform circle into a uniform square requires the azimuthal deflections indicated by the difference between dashed radii 33 of FIG. 3 and radii 43 of FIG. 4. Due to symmetry, this deflection is zero along the coordinate axes and along the diagonals. Let the variable x be in the range from 0 to 1 to cover the angular range 0° to 45°, representing the fraction of the flux in that range (i.e., $1/8^{th}$ of the entire circle). FIG. 5 shows graph 50 with abscissa 51 denoting azimuth angle $\theta_c$ ranging from 0 to 45 degrees and ordinate 52 denoting deflection $\delta=\theta_s-\theta_c$ in degrees. Uniform angular spacing means that the flux from 0° to θ=45x is simply x, a consequence of the uniform illumination of circle 31 of FIG. 3. Let square 42 of FIG. 4 have unit half-width, so that the uniformly spaced tips of arrows 45 lie at evenly spaced values of the coordinate x, which is given by x=$\tan\theta_s$, where $\theta_s$ is the azimuth of unevenly spaced dashed radii 43.

The required azimuthal deflection is the difference between the these two azimuths at any given flux fraction x: $\delta=\tan^{-1}x-45x$, with a maximum value of 4.07456859622276, but not at the symmetrical 45/2=22.5° rather at 23.522544°, as can be seen from close inspection of the slightly asymmetric top of curve 53 of FIG. 5. These azimuthal deflections of a few degrees are in great contrast to the much larger radial deflections involved in transforming the Lambertian distribution 23 of FIG. 2 into the $\cos^{-3}$ pattern 24, which is what is required to produce the uniformly illuminated circles 31 of FIG. 3 and 41 of FIG. 4.

The free-form shapes of the surfaces of the preferred embodiments disclosed herein are such as to bring about both the radial and azimuthal deflections that are required to redistribute the circularly symmetric Lambertian intensity distribution of an LED chip into one that uniformly illuminates a nearby planar square.

The Lambertian emission of an LED chip has a significant portion of its luminosity at high off-axis angles. In fact, a Lambertian source's cumulative off-axis emission is simply equal to $\sin^2\theta$, as for example 50% at 45°, 75% at 60°, and 90% at 72°. Sometimes, however, LED chips are encapsulated in a hemisphere that for the sake of compactness is only a little bigger than the chip itself. When instead the hemisphere is at least n times bigger than the chip diagonal (n=refractive index of the encapsulant, typically around 1.45), the output distribution remains Lambertian and the chip simply appears magnified n times but otherwise undistorted. A smaller hemisphere will distort light from a corner, making it look peeled upward, so that horizontal emission is no longer zero but 10% of the on-axis maximum, thereby producing a 'supra-Lambertian' pattern.

Figure 6:
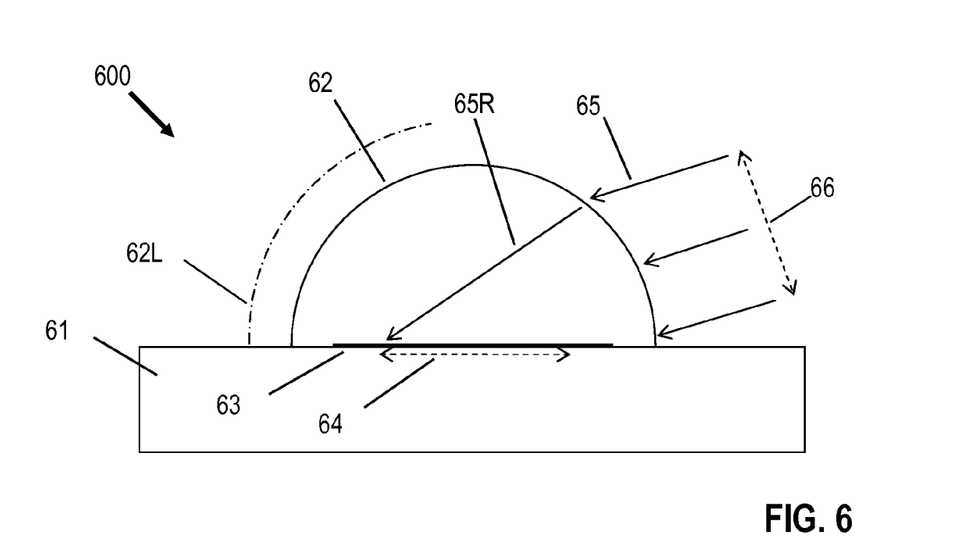
FIG. 6 compares small and large hemispheric encapsulants of LED chips.

FIG. 6 shows an LED 60 having the proportions of commercially available high-power LEDs such as the XP-G model sold by the Cree Corporation, truly a miniature device, with a base width of only 3.5 mm. Package base 61 supports 2.6 mm hemispheric encapsulation dome 62 and square chip 63, shown as a diagonal cross section to show how it 'crowds' the dome 62. Double-arrow 64 shows the chip's width across its square profile. Viewing-rays 65 are drawn at a typical low angle of 16° from the horizontal (74° off-axis), as they project from a viewer's eye (not shown). They are refracted downward by dome 62 to intercept chip 63. Thus double arrow 66 shows the height of the source image as seen by the viewer.

Figure 6A:
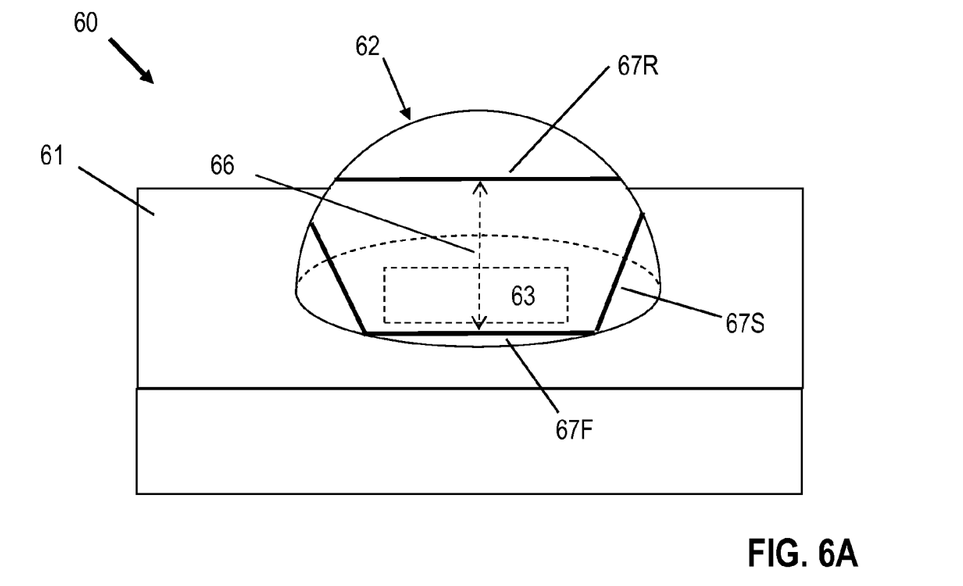
FIG. 6A shows how small domes over-magnify laterally.
Figure 7:
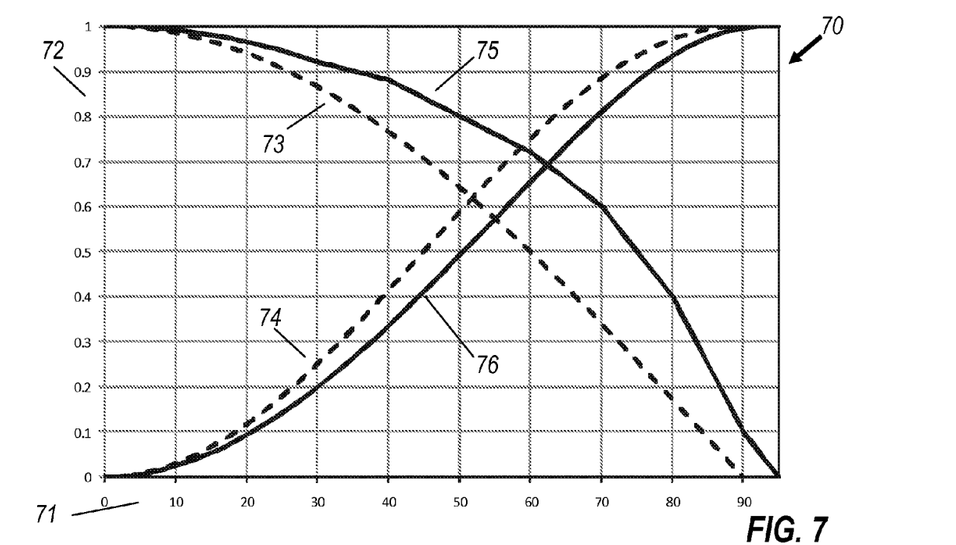
FIG. 7 is a graph comparing Lambertian to supra-Lambertian intensity.

FIG. 6A depicts what that viewer sees, with tilted package 61 and dome 61. Dotted rectangle 62 outlines the actual chip while the chip's magnified image 67 can be seen outlined by front edge 67F, lateral edges 67L, and rear edge 67R. Double arrow 66 is again the height of trapezoidal source image 67. Conventional LEDs have domes that are larger than the chip by a factor at least that of the encapsulant refractive index, typically about 1.46. Such a dome is shown in FIG. 6 by dash-dot arc 62L, only partially representing a hemisphere so as not to interfere with lines 65. In the case of actual dome 62, however, the relatively large chip 'crowds' the dome and produces more source magnification at large off-axis angles than the $n^2$ magnification of a large-enough dome. This advantageously produces a 'supra-Lambertian' emission, helping the preferred embodiments disclosed herein to better utilize lateral rays FIG. 7 shows graph 70, with abscissa 71 in degrees off-axis and ordinate 72 scaled from 0 to 1. Dashed curve 73 is the cosine function of a Lambertian source and dashed curve 74 is its cumulative function, $\sin^2\theta$, which reaches unity at 90°. Solid curve 75 lies above curve 73, hence the 'supra-Lambertian' term. Solid curve 76 is its cumulative distribution, lying to the right of curve 74, because of the greater lateral fraction of its emission. Such supra-Lambertian LEDs as the XP series by Cree will thus pose an efficiency challenge to any lenses that do not totally surround them, because of their strong lateral emission.

Figure 7A:
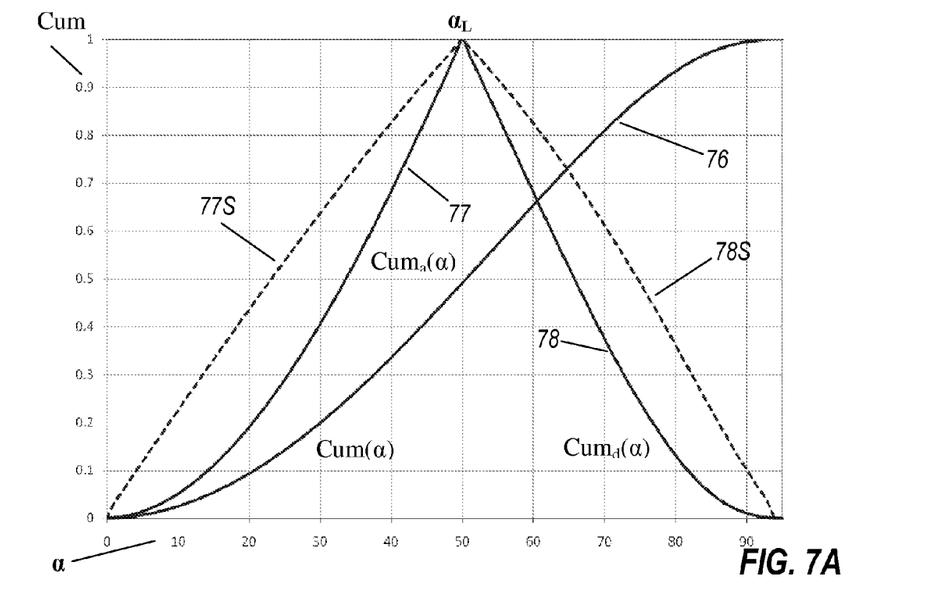
FIG. 7A shows the partition of a supra-Lambertian distribution.

FIG. 7A redraws graph 70 and supra-Lambertian cumulative distribution 76, along with cumulative distributions 77 and 78 derived therefrom. Their utilization will be discussed below.

Full collection of the LED's flux, however, limits how narrow the output beam can be, because of the high deflections required for lateral light to become forward-going light. The above-mentioned free-form lenses of the prior art only produce wide-angle patterns (±60° or more), since they are refraction-only. It is the objective of the preferred embodiment to provide uniformly illuminated square patterns for narrower patterns than this.

Preferred embodiments are lens elements comprising four surfaces: a top light-emitting surface, a lateral TIR surface, an interior cavity, and a flat base suitable for mounting means. The interior cavity is defined by its upper and lateral interior surfaces, both of which markedly depart from circular symmetry in order to bend more light toward the target's diagonals. The top light-emitting surface, however, is circularly symmetric, which is advantageous for mold fabrication. The lateral surface is a cone that departs only a few degrees from circular symmetry, leaning a little more horizontally on the diagonals. (This also alleviates mold costs since it is still a developable surface.) This nearly indiscernible departure from circularity of the TIR surface suffices for the different off-axis angles going to the outside edge or the corner, on the target square to be illuminated. The lateral surface must tilt far up enough from horizontal else TIR will fail within it, but otherwise the different preferred embodiments can differ considerably in the proportions of these surfaces.

A relatively small light source enables the lens to produce a square with a well-defined border, so the corners are well-defined. Increasing the source size will fuzz the pattern, eventually making it circular. This idea is illustrated by dotted circles 36 of FIG. 3, denoting a ±10% smearing of the circle 31. Such a smearing would make the formation of square 32 difficult. The sharpness of the edge of an illumination pattern can only be attained by a luminaire with a minimum size relative to its source. While a sharp edge is uncommon with the round outputs of commercial luminaires, a square can't much be fuzzy and still be a square.

Key to attaining high efficiency of an illumination lens is the collection of the LED's side-going light, such as rays more than 60° off-axis, because of their significant fraction of the LED's luminosity. The difficulty arises whenever the rectangular output of moderately wide angles, such as 20-55°. The farther away is a square target and the smaller the angle it subtends at the illumination lens, the greater the deflection which lateral rays must receive from the lens. A single refractive surface can in practice deflect a ray 20-25°, requiring incidence angles of 52-60°, beyond which reflections and distortion are excessive. Thus the two surfaces of a refraction-only lens can in practice bend edge rays up to 40-45°.

A target at a distance of only 1.5 times its width will subtend a relatively narrow ±18° across and ±25° diagonally, much smaller angles than emitted by an LED, so that large deflections are necessary, requiring high incidence angles. In turn, high incidence angles require a thick lens. A two-surface refractive illumination lens that is thick enough for 60° incidence angles will bend the edge rays a total of 40°. Thus it can only utilize source light out to 68° off-axis, beyond which is another 16% of the light of a Lambertian distribution. For the supra-Lambertian distribution 76 of FIG. 7, this is 24%, one that the preferred embodiment can fully utilize.

Figure 8:
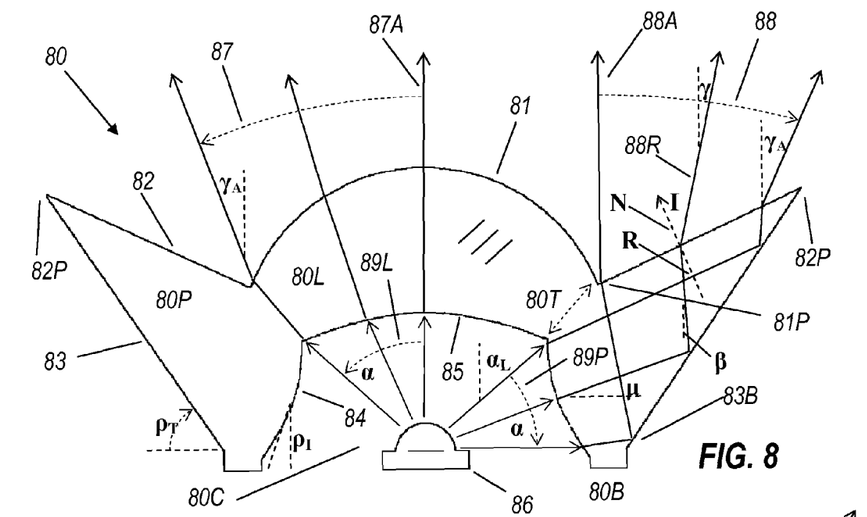
FIG. 8 shows an illumination lens of the present preferred embodiment.

Rather than such a thick refraction-only lens that must let unusable lateral light escape beneath it, preferred embodiments disclosed herein that produce the same desired square will instead comprise an annular TIR prism surrounding a smaller and thinner central refraction-only lens. FIG. 8 shows free-form illumination lens 80, bounded by upper spherical surface 81, upper conical surface 82, lateral quasi-conic TIR surface 83, circumferential entry surface 84, and free-form lower lens-surface 85. Lens 80 comprises central refraction-only lens 80L, bounded by upper surface 81 and lower surface 84, and annular TIR prism 80P, bounded by surfaces 82, 83, and 84. Gap 80T joins central lens 80L and annular TIR prism 80P into a single monolithic illumination lens. Gap 80T has a minimum size, typically a few millimeters, dictated by mold-flow and to provide a shadow for mounting base 80B. Free-form surfaces 84 and 85 enclose cavity 80C, which completely surrounds the central LED light source 86, so that all its light is collected.

In FIG. 8, central refraction-only lens 80L generates a complete output pattern, shown by dotted arc 87 of output angle γ ranging from 0 to edge-ray angle $\gamma_A$, the angular half-width of the target. For target width W and height H above LED chip 86, target angular half-width is given by $$\gamma_A = \tan^{-1}(W/2H)$$

Here the subscript A stands for axial. A second, completely overlapping square output pattern is produced by prism 80P, shown as dotted arc 88 spanning the same edge-ray angle $\gamma_A$. Both square patterns have diagonal angular half-width $\gamma_D$, given by $$\gamma_D = \tan^{-1}(\sqrt{2}W/2H) = \tan^{-1}(W/2H).$$

For various relative target heights, Table 1 lists their values of target angular semi-width, on-axis and diagonal. FIG. 8 is for H/W=1.16.

TABLE 1

Angular half-widths of rectangular targets of width W at distance H

| H/W | 2 | 1.5 | 1 | 0.75 | 0.5 |
|---|---|---|---|---|---|
| $\gamma_A$ | 14.0° | 18.4° | 26.6° | 33.7° | 45° |
| $\gamma_D$ | 19.5° | 25.3° | 35.3° | 43.3° | 54.7° |
| $(\gamma_D/\gamma_A)$ | (1.387) | (1.369) | (1.327) | (1.286) | (1.216) |

Note the declining ratio of the two angles, while their tangents keep the ratio √2. Their absolute difference actually levels out, and it is $\gamma_D-\gamma_A$ against which the above-mentioned 'fuzziness' must be specified, say as not to exceed 20%.

Central lens 80L collects input light designated by arc 89L, comprising all directions of emission within an off-axis angle $\alpha_L$. Annular TIR prism 80P collects the remaining input light, designated by arc 89P, comprising all light beyond $\alpha_L$. This edge-ray angle $\alpha_L$ is a freely chosen design parameter, in this case being at 50°, the 50% cumulative flux angle of supra-Lambertian LED 86, as shown by curve 76 of FIG. 7. Other values will be illustrated below. It is of course also possible for the two output patterns to be otherwise than coincident, but the result is likely to be less aesthetic, since the overlap helps each pattern hide the flaws of the other. It is also possible for the output pattern to be annular, with a dark center, if desired, simply by deflecting central rays 87A and 88A off-axis by minor alterations of the lens profile. This will be obvious to anyone skilled in optical design who is capable of utilizing the design procedures disclosed herein.

An important advantage is the free-form character of the surfaces, even though the mold-fabrication costs are higher than for rotationally symmetric surfaces. In particular, preferred embodiments are disclosed wherein only the interior surface is fully free-form. This approach is illustrated by illumination lens 80 of FIG. 8A. Its upper surface, wherefrom light exits, is completely circularly symmetric, being the combination of a spherical refraction-only central lens 81 and a cone 82 sweeping upward from circular perimeter 81P of the central lens 81. This refractive cone 82 terminates along a somewhat non-circular perimeter 82P, where the lateral surface 83 intercepts it.

As seen in FIG. 8, from non-circular tip-perimeter 82P the lateral TIR surface 83 sweeps down and inward, acting as the TIR surface of illumination lens 80. TIR surface 83 is a quasi-cone with its apex angle varying a few degrees going around it, specifically leaning down a few degrees more on the diagonal than on the axis. The lateral TIR surface, like a true cone, is developable (i.e. made by wrapping a planar cutout), in that its profile is an uncurved straight line of slightly varying tilt angle $\rho_T$, which is a few degrees less along a diagonal than along an axis. The variations in cone angle act to radially spread the light from circle to corners.

The interior surface 84 of the TIR prism 80P is fully free-form, acting to both radially and azimuthally redistribute the light of the central LED 86. It is mirror-symmetrical about its axes and its diagonals, so that mathematically it is only required to numerically generate lens coordinates from 0 to 45 degrees. With rectangular targets a full 90 degrees would have to be generated. The interior surface's local tilt angle from vertical, angle $\rho_I$, is adjusted point-to-point so that exemplary ray 88R is properly refracted as it enters TIR prism 80P. Thereafter its course is fixed, because surfaces 82 and 83 have straight-line profiles, so that all rays encounter them at the same slope. Thus only interior surface 84 remains adjustable in order to properly distribute the flux from LED source 86 onto a rectangular target. As the closest surface to LED source 86, cavity 80C scales the overall size of illumination lens 80 relative to the LED's width. Cavity 80C must be large enough to assure that the light it receives has relatively narrow angular extent ±σ, where narrow usually means under ±10°.

Figure 8A:
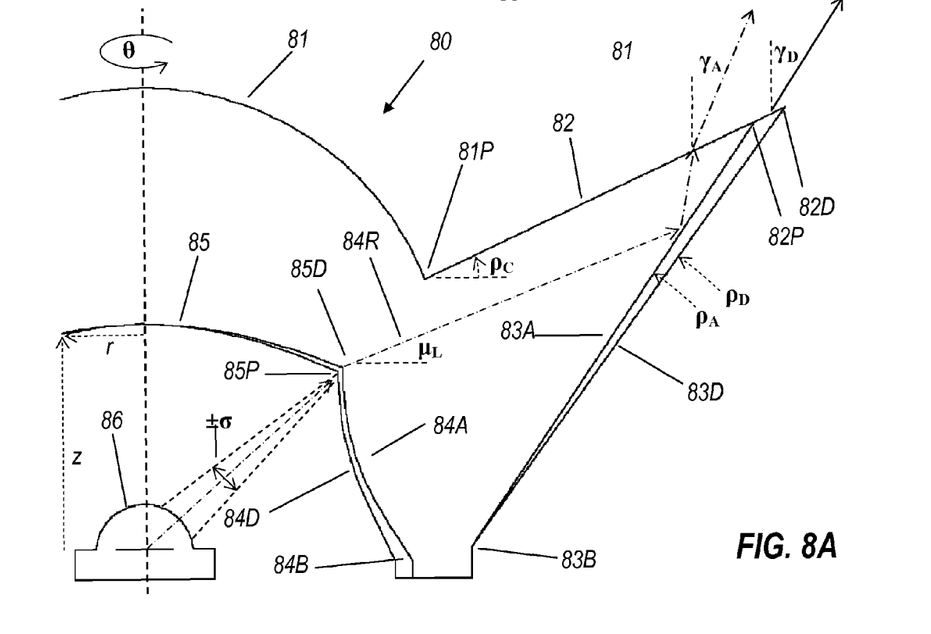
FIG. 8A shows the axial vs. diagonal profiles of same.

FIG. 8A magnifies the right side of FIG. 8 in order to show both axial and diagonal lens profiles. Upper surfaces 81 and 82 are circularly symmetric and thus have identical profiles, except that cone 82 extends to point 82P on-axis but to somewhat farther out point 82D on the diagonals. Lateral TIR surface 83 has a straight-line profile slightly varying in tilt from horizontal. On-axis profile 83A is tilted from horizontal at the angle $\rho_A$, extending from circular base 83B to tip 82P. Only slightly different, diagonal profile 83D is tilted from horizontal at the angle $\rho_D$, extending from circular base 83B to tip 82D.

In contrast, interior surface 84 differs oppositely in axial vs. diagonal profiles, as shown in FIG. 8A, in that the on-axis profile 84A is slightly outside the diagonal profile 84D. On-axis profile 84A extends vertically downward from upper corner 85P while slightly inward diagonal profile 84D extends downward from upper corner 85D. These corners, 85P and 85D, are the ends of the axial and diagonal profiles of free-form surface 85, the lower surface of the central refraction-only lens 80L. Both corners 85P & 85D lie at off-axis angle $\alpha_L$ from the center of LED 86. Perimeter 85P is non-circular, as shown in FIG. 8C, because of this radial change going from on-axis to diagonal. At both points, interior surface 84 has vertical slope to minimize the angle $\mu_L$, but only for a fraction of a millimeter, so that mold release is not compromised.

Figure 8B:
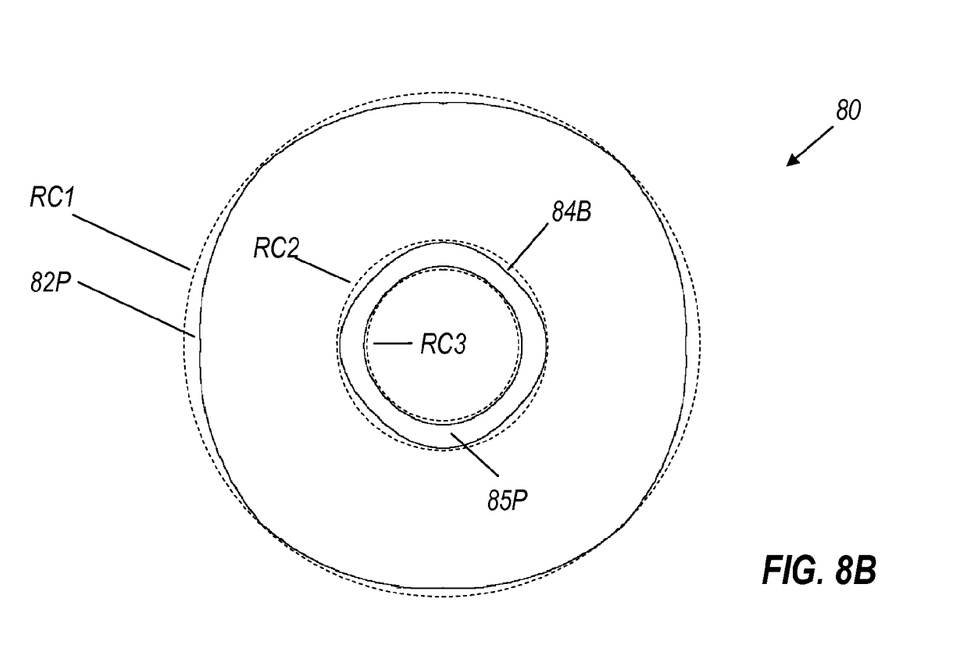
FIG. 8B shows the characteristic out-of-round profiles of same.

FIG. 8B is a view from above of the non-round edges of illumination lens 80. Perimeter 82P on upper cone 82 can be compared with circumscribed dashed reference circle RC1 to see that it has modest diagonal swelling. Base perimeter 84B of interior surface 84 can be compared with circumscribed dashed reference circle RC2 to see its shrunken diagonals. Perimeter 85P is the least out-of-round of the three, with only minor departures from inscribed dashed reference circle RC3. This is because it is constrained to lie along the cone defined by central angle $\alpha_L$ subtended at the center of source LED 86 of FIG. 8.

Perimeter 85P is defined by rays arriving at the angle $\alpha_L$ from the center of the LED. (Rays from other parts of the chip will be discussed below) As the defining edge ray is incident upon that vertical slope on the top edge of surface 84, it will be deflected downward by refraction to become ray 84R, at angle $\mu_L$ from horizontal, given by $$\mu_L = \sin^{-1}(\cos \alpha_L/n) = 24°$$

This particular value is for n=1.58 of polycarbonate and $\alpha_L=50°$.

Cone surface 82 is in this case given a cone angle $\rho_C$ equal to $\mu_L$, so that it will not interact with any rays going toward lateral TIR surface 83. Due to thickness 80T of FIG. 8, the distance between cone 82 and ray 84R allows the cone to take a lesser angle if desired, limited only by TIR failure. This option will be disclosed below.

As shown in FIG. 8, the angle α ranges from 0 to 90°, or even a little more in supra-Lambertian LEDs. It is the input variable for deriving the lens profile, while the off-axis output angle γ(α) varies from 0, towards the center of the target, then across target to the output angle $\gamma_A$, towards the edge of the target. The exact value of γ(α) will depend upon the source's cumulative flux distribution, as shown in FIG. 7A, where the abscissa is now identified with the input angle α and the ordinate with cumulative flux Cum, ranging from 0 on-axis to unity at 95 degrees. Curve 76 reads out the cumulative flux function $Cum(\alpha)$ of a supra-Lambertian source such as 86 of FIG. 8. Cumulative flux is also known as encircled flux, and its square root is the radius of the encirclement. When uniformly illuminating a square, for instance, a square that contains a fraction f of the total will be $\sqrt{f}$ times smaller. In this case the scale factor $\sqrt{f}$ will be applied to the tangent of $\gamma_A$ or $\gamma_D$.

Because illumination lens 80 generates two output patterns, there are two output angle assignments $\gamma(\alpha)$, using two partitions of the cumulative flux distribution, under and over the angle $\alpha_L$. The first is for central refraction-only lens 80L, utilizing the flux from 0 to $\alpha_L$, so that its cumulative flux distribution is 100% at that angle: $Cum_A(\alpha_L)=1$, giving $$Cum_A(\alpha)=Cum(\alpha)/Cum(\alpha_L) \quad \alpha<\alpha_L$$

FIG. 7A shows this function as curve 77.

The value of output angle $\gamma_a(\alpha)$ assigned to each value of the input angle $\alpha$ is $$\tan \gamma_a(\alpha) = \sqrt{Cum_A(\alpha)} \tan \gamma_A.$$

FIG. 7A shows this square root as dashed curve 77S. It is nearly a straight line.

The second partition of the cumulative flux distribution $Cum(\alpha)$ is for TIR prism 80P and runs in the opposite direction, due to the mirror nature of the TIR prism.

$$Cum_D(\alpha)=[1-Cum(\alpha)]/[1-Cum(\alpha_L)]$$

FIG. 7A shows this function as curve 78.

Similarly, along the diagonal the output-angle assignment is $$\tan \gamma_d(\alpha) = \sqrt{Cum_D(\alpha)} \tan \gamma_D$$

FIG. 7A shows this square root as dashed curve 78S. It too is nearly a straight line.

These two functions $\gamma_a(\alpha)$ and $\gamma_d(\alpha)$ will be used to generate slightly differing profiles of surfaces 84 and 85, in the axial and diagonal directions. Any direction intermediate between axial and diagonal will have a profile lying between them that is a linear combination of the two. A conveniently smooth way to calculate such a linear combination is via the azimuthal angle $\theta$, shown at the top of FIG. 8A.

In FIG. 8A the tilt angles $\rho_A$ and $\rho_D$ of TIR surface 83 have the values necessary to internally reflect light at angle $\mu_L$ from horizontal into a ray that will be refracted by exit cone 82 into the external off-axis angle $\gamma_A$ toward the edge of the target, or angle $\gamma_A$ toward the corner. These values are given by $$I_A=\rho_C+\gamma_A \quad I_D=\rho_C+\gamma_D$$

$$R_A=\sin^{-1}(\sin I_A/n) \quad R_D=\sin^{-1}(\sin I_D/n)$$

$$\beta_A=R_A-\rho_C \quad \beta_D=R_D-\rho_C$$

$$\rho_A=\tfrac{1}{2}(90°+\rho_C-\beta_A) \quad \rho_D=\tfrac{1}{2}(90°+\rho_C-\beta_D)$$

In FIG. 8 the result is $\rho_A=55.1°$ and $\rho_D=53.3°$.

In FIG. 8A, generic ray 88R going from exit cone 82 toward the target at an output angle $\gamma$ will leave the cone surface 82 at an incidence angle I, with the surface normal N, given by $$I=\rho_C+\gamma,$$

Inside surface 82 the ray has an angle R with the normal N given by $$R=\sin^{-1}(\sin I/n)$$

Within TIR prism 80P the ray has the angle $\beta$ from vertical, given by $$\beta=R-\rho_C$$

The incidence angle of the ray with the TIR surface 83 is given by $$I_T=\rho_T+\beta$$

Before reflection off TIR surface 83 the angle $\mu$ from horizontal given by $$\mu=180°-I_T-\rho_T$$

Recall that the cone angle $\rho_T$ of lateral surface 83 varies between $\rho_A$ and $\rho_D$.

Figure 11:
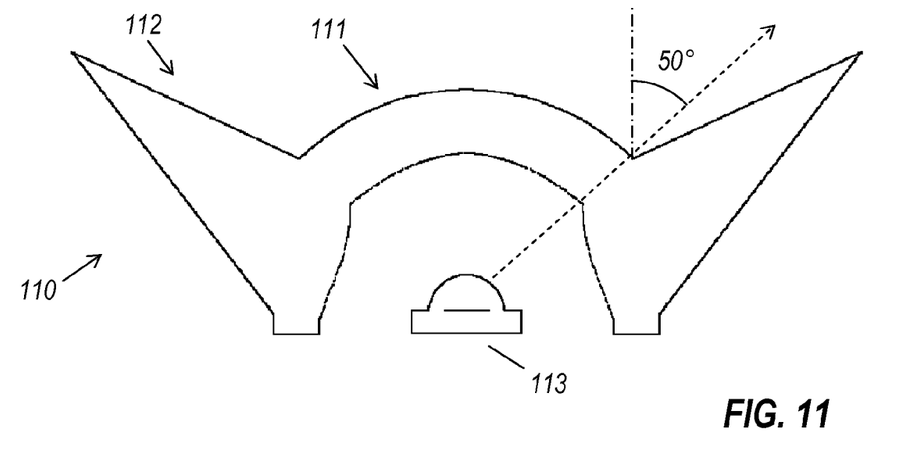
FIG. 11 shows a smaller, wider-angle version of the lens.

Table 1 above can be augmented with the characteristics of the various lenses for illuminating those targets. Table 2 further lists the edge-ray incidence angles at the tip of exit surface 82. The rightmost column shows substantial flux loss to the diagonals. Compensation for this will be discussed below, but these losses and the proximity to the critical angle (bottom row) show that this is the nearest target, with the widest subtended angle, of this lens's illumination capability. FIG. 11, discussed below, shows an example of a preferred embodiment for this illumination angle. For closer targets a refraction-only lens is generally preferable, but the lens of FIG. 11 is actually smaller than its all-refraction counterpart, shown in FIG. 12 at the same scale.

TABLE 2

| Lens parameters for Cone $\rho_C = 24°$, rectangular target width W at distance H | | | | | |
|---|---|---|---|---|---|
| H/W | 2 | 1.5 | 1 | 0.75 | 0.5 |
| $\gamma_A$ | 14.0° | 18.4° | 26.6° | 33.7° | 45° |
| $\gamma_D (\gamma_D/\gamma_A)$ | 19.5° (1.387) | 25.3° (1.369) | 35.3° (1.327) | 43.3° (1.286) | 54.7° (1.216) |
| $I = \rho_C + \gamma$ | 38°, 43.5° | 42.4°, 49.3° | 50.6°, 59.3° | 57.7°, 64.3° | 69°, 78.7° |
| R | 22.9°, 25.8° | 25.3°, 28.7 | 29.3°, 33.0° | 32.3°, 34.8° | 36.2°, 38.4° |
| Fr refl. | 5.6%, 6.0% | 5.9%, 6.8% | 7.1%, 9.9% | 9.2%, 15.4% | 17.2%, 36% |
| $\rho_A, \rho_D$ | 57.5°, 56.1° | 56.4°, 54.7° | 54.4°, 52.5° | 52.8°, 51.1° | 50.9°, 49.8° |
| $I_T$ | 46.8° | 45.4° | 43.3° | 41.9° | 40.6° |

In FIG. 8, ray 88A ($\gamma=0$) will have angle $$\beta(0)=\sin^{-1}(\sin \rho_C/n)-\rho_C=-9.1°$$

Consequently, incidence angle $I_T$ is 46° on-axis and 44.2° diagonally. Both values are greater than the critical angle $$\theta_C=\sin^{-1}(1/n)=39.26° \text{ for polycarbonate.}$$

The bottom row of Table 2 shows that the central-ray diagonal incidence angle is not a problem for polycarbonate, though it might be for acrylic (n=1.485).

The interior surface 84 has to have its local tangent at the angle $\rho_I$ from vertical that will refract a ray at angle $\alpha$ into the angle $\mu$, at the value required to be reflected and then refracted into exiting at the angle $\gamma$ it must have to produce uniform illumination. Calculating the value of this angle $\rho_I$ is most easily done with a vector approach, whereby rays have length equal to the refractive index, so that a unit vector T along the ray in air, upon entering the medium, is refracted into vector U of length n. Then the local normal vector N must have the same direction as the difference vector U−T. Using the a horizontal unit vector i and a vertical unit vector k, the ray vector in air is $$T = i \sin \alpha + k \cos \alpha$$

Inside the lens the ray vector becomes $$U = n(i \cos \mu + k \sin \mu)$$

The surface normal vector is simply $$N = (U-T)/|U-T|$$

This immediately yields the angle $\rho_I$ according to $$N = i \cos \rho_I - k \sin \rho_I$$

This angle is used to locally generate the profiles shown in FIG. 8A.

For a particular target distance, a design is specified by the central height of surface 85, namely z(0), as well as the parameter $\alpha_L$, which determines where the central lens 85 will terminate. Typically the angle $\alpha_L$ is selected to be near that of 50% cumulative encircled flux, so both parts of the lens handle about the same amount of flux. From $\alpha_L$, Snell's Law determines the cone angle $$\rho_C \leq \sin^{-1}(\cos \alpha_L/n)$$

Figure 9:
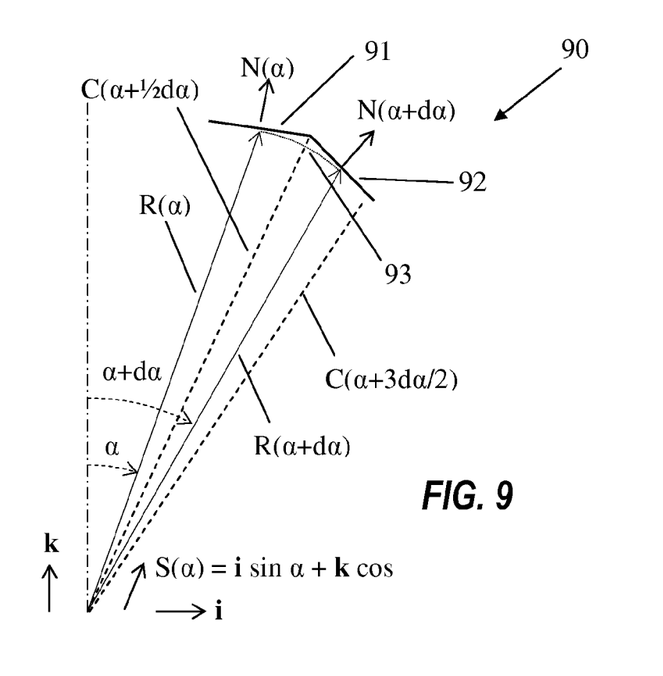
FIG. 9 is a diagram of an iterative step in the vector-based profile-generation.

In FIG. 8A, surface 85 is shown with barely separated axial and diagonal profiles, which can be specified by the height z(r) of surface 85 at a distance r from the center. Thus there will be two profiles $z_A(r)$ and $z_D(r)$, generated with a point-by-point mathematical algorithm that calculates coordinates at $\alpha+d\alpha$ from those a previously known coordinate for $\alpha$. FIG. 9 delineates the upper and lateral lens surfaces with grids that are spaced every degree ($d\alpha=1°$), with ray vector T given above. Within the lens the ray vector is given by $$U = n(i \sin \beta + k \cos \beta)$$

In lieu of ray-tracing through the spherical exit surface 81, the angle β within the lens can be approximated by $$\beta = \tfrac{1}{3}(\alpha+\gamma)$$

From the vectors T and U, the surface normal vector N for surface 85 is derived in the same way as previously discussed for surface 84, for all values of α up to $\alpha_L$, for both on-axis and diagonal profiles. Each value of α has a corresponding directional unit vector given by $$S(\alpha) = i \sin \alpha + k \cos \alpha$$

FIG. 9 is a schematic diagram of the segment-by-segment derivation of profile 90, similar to that of surface 85 of FIG. 8. The center of segment 91 is at an already known location (r,z) and the next segment 92 is to be calculated. FIG. 9 further shows directional unit vectors i, k, and S(α), all moved off the origin for the sake of clarity. The unit normal vector N(α) is known for every α. Position vector R(α) is given by $$R(\alpha) = |R(\alpha)| S(\alpha)$$

Its length |R(α)| (scalar magnitude) is given by the previously know values of r and z $$|R(\alpha)| = \sqrt{(r^2+z^2)}$$

Along the known direction $S(\alpha+\tfrac{1}{2}d\alpha)$ will lie the control-point vector $C(\alpha+\tfrac{1}{2}d\alpha)$, given by $$C(\alpha+d\alpha/2) = S(\alpha+d\alpha/2) \frac{N(\alpha) \cdot R(\alpha)}{N(\alpha) \cdot S(\alpha+d\alpha/2)}$$

This defines the outer edge of segment 91 of FIG. 9, from which will 'hinge' segment 92 so it adopts the angle given by the surface normal vector $N(\alpha+\tfrac{1}{2}d\alpha)$. The next coordinate point $R(\alpha+d\alpha)$ is where segment 92 is intercepted by an extension of directional unit vector $S(\alpha+d\alpha)$, which for the sake of clarity is not shown.

$$R(\alpha+d\alpha) = S(\alpha+d\alpha) \frac{N(\alpha+d\alpha) \cdot C(\alpha+d\alpha/2)}{N(\alpha+d\alpha) \cdot S(\alpha+d\alpha)}$$

This iteration continues until the input variable α reaches its limit $\alpha_L$. The segments 91 and 92 uniquely define a tangent parabola 93, shown dotted and slightly offset for clarity. This curve is known as a second-order Bezier curve, from which the term 'control point' originates. Moving a control point changes the shape of its Bezier parabola while keeping it tangent to the segments at its two endpoints. For the sake of symmetry the control points are put halfway between the desired coordinate points. The vector P to any point on parabola 93 between its points of tangency with segments 91 and 92 is indexed by a parameter t varying from 0 to 1:

$$P_\alpha(t) = (1-t)^2 R(\alpha) + 2t(1-t)C(\alpha+\tfrac{1}{2}d\alpha) + t^2 R(\alpha+d\alpha)$$
$$0 < t < 1.$$

The well-known NURBS methods in computer-aided graphics will use such a series of parabolic segments 93 to construct a smooth higher-order polynomial formula for profile 90.

This vector method is applied to generate the on-axis and diagonal profiles of surface 85 of FIG. 8. Thereafter the on-axis and diagonal profiles of interior surface 84 can be similarly generated downward, starting at the perimeter of surface 85 and ending slightly at base 84B, below the level of LED source 86, in order to catch all its light, even the slightly down-going rays at the fringe of a supra-Lambertian source.

Once the on-axis and diagonal profiles $z_A(r)$ and $z_A(r)$ of surface 85 and then $r_A(z)$ and $r_A(z)$ of surface 84 have been determined, they can be combined for to generate the entirety of surfaces 84 and 85. Using azimuth θ as shown in FIG. 8A, anywhere on the surface that is in between the on-axis and diagonal profiles will has a profile given by a simple trigonometric weighting:

$$z(r,\theta) = z_A(r)\cos 2\theta + z_D(r)\sin 2\theta \quad 0 < \theta < 45° \text{ for surface 85}$$

$$r(z,\theta) = r_A(z)\cos 2\theta + r_D(z)\sin 2\theta \quad 0 < \theta < 45° \text{ for surface 84}$$

This gives the surfaces an eight-fold mirror symmetry, about the four axial and four diagonal directions, a symmetry that literally means these surfaces are not 100% freeform, though not circularly symmetric either.

Figure 10:
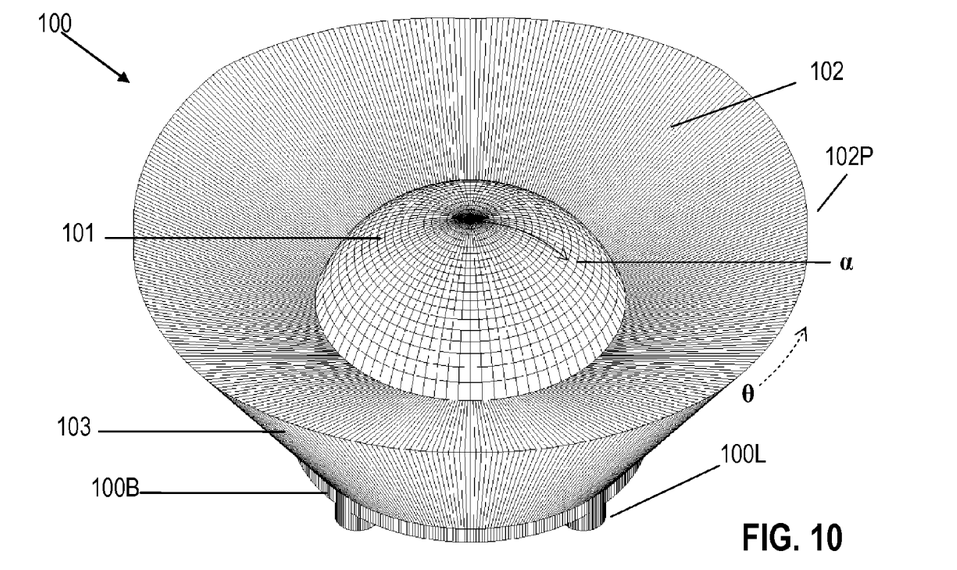
FIG. 10 is a perspective view from above of the illumination lens.

FIG. 10 is a perspective view from above of illumination lens 100, showing central refraction-only lens 101, exit cone 102 with non-circular perimeter 102P, lateral TIR surface 103, and base 100B, from which protrude mounting legs 100L.

Figure 10A:
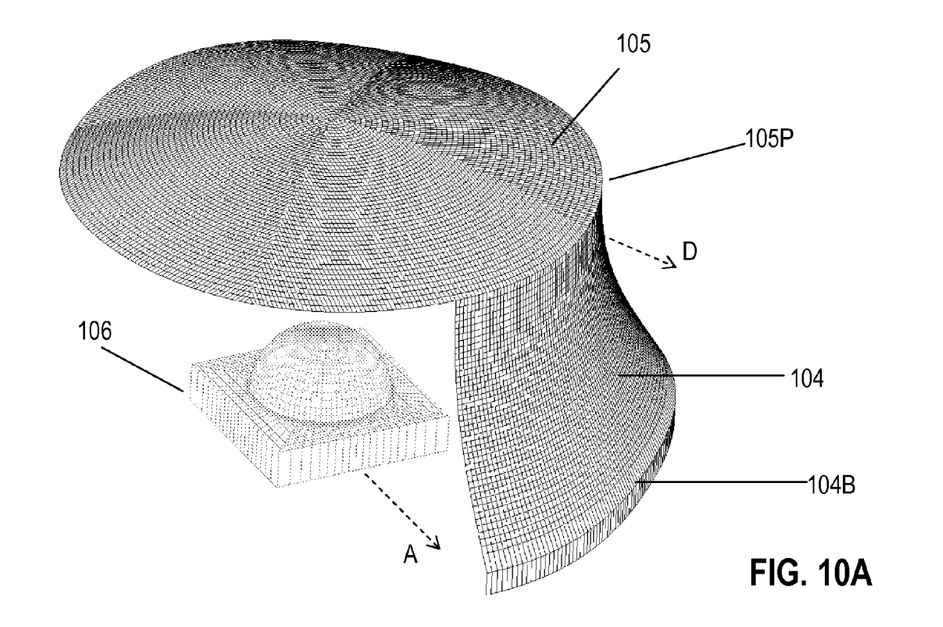
FIG. 10A is a perspective cutaway view of the interior surface of the lens.

FIG. 10A is a perspective cutaway view of the interior surface of illumination lens 100, showing freeform lower surface 105 with perimeter 105P and freeform interior surface 104 with base perimeter 104B. Central LED source 106 illuminates the two surfaces. Axis direction A and diagonal direction D are the defining directions in that the surface profiles along them, as shown in FIG. 8A, will determine the entire freeform surface of both.

The chosen parameter $\alpha_L$ marks the divide between the central refraction-only lens and the surrounding TIR prism. It also fixes the refracted ray angle $\mu_L$, and the cone angle $\rho_C$, which as previously mentioned may differ somewhat from $\mu_L$. Its value of 50° was chosen because it divides into two halves the flux of a super-Lambertian source, with each half forming its own square pattern. If the division was not even, one pattern would be weaker than the other, but for some situations this may be desirable.

When the square target is much closer, as in the rightmost column of Table 2, the target angle γ begins to exceed the above-mentioned 50°. FIG. 11 shows illumination lens 110, comprising central refractive lens 111 and surrounding TIR prism 112, both generated by the same rules disclosed above that generated the lens of FIG. 8. Lens 111 is basically a quasi-spherical shell that deforms the flux into a square with very little net deflection.

Figure 12:
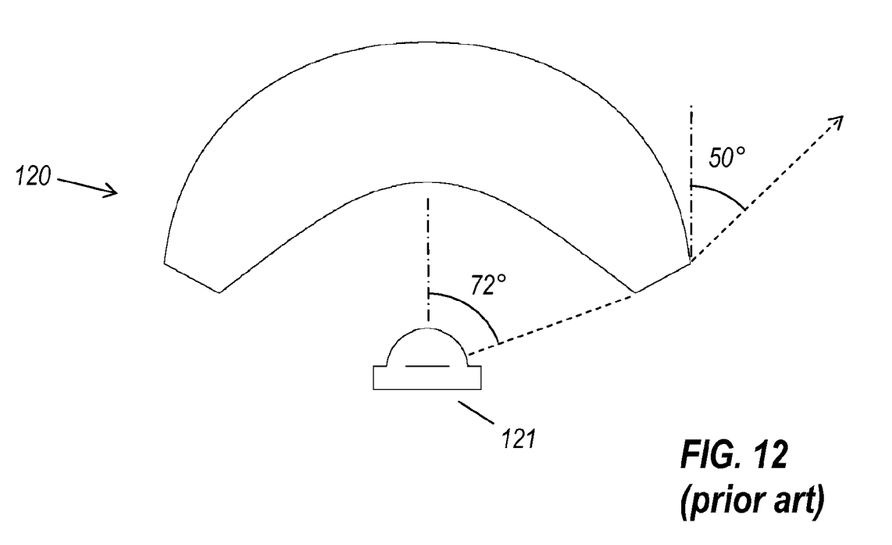
FIG. 12 shows how much thicker is the equivalent all-refraction lens.

As a comparison, FIG. 12 shows a refraction-only lens 120 of the prior art, configured to make the same illumination pattern with the same LED 121 as in FIG. 11. This lens is taller and thicker than that of FIG. 11, but not as wide. It is less advantageous in that it collects light only out to 72° from the LED axis, with the remainder escaping uselessly beneath the lens. In the case of a Lambertian LED this loss is an acceptable 10% but in super-Lambertian LEDs it would be a less palatable 20%.

The preceding description of the presently contemplated best mode of practicing the preferred embodiment is not to be taken in a limiting sense, but is made merely for the purpose of describing the general principles of the preferred embodiment. The full scope of the invention should be determined with reference to the Claims.

I claim:

1. A dual free-form lens for producing illumination patterns having corners using a hemispherical light pattern-emitting LED, comprising:
    a central refractive lens intercepting approximately one half of the hemispherical light pattern, from a central axis outward to a predetermined angle;
    an annular total internal reflection prism surrounding the central refractive lens, intercepting the hemispherical light pattern beyond the predetermined angle;
    the central refractive lens and the total internal reflection prism forming a cavity for receiving the LED;
    wherein the central refractive lens and the total internal reflection prism produce two substantially overlapping illumination patterns; and
    wherein surface distortions in the central refractive lens and the total internal reflection prism spread light azimuthally toward the corners of the illumination patterns.

2. The dual free-form lens of claim 1 wherein the surface distortions occur on portions of the dual free-form lens facing the cavity.

3. The dual free-form lens of claim 1 wherein portions of the dual free-form lens outside the cavity are rotationally symmetric.

4. The dual free-form lens of claim 1 wherein the central refractive lens and the total internal reflection prism share a common edge ray angle.

5. The dual free-form lens of claim 1 wherein the LED emits a supra-Lambertian cumulative light distribution.

6. The dual free-form lens of claim 1 wherein the predetermined angle comprises an edge ray angle substantially at 50% of the LED's total output.

7. The dual free-form lens of claim 1 wherein the total internal reflection prism includes a developable lateral outer surface of slightly varying tilt.

8. The dual free-form lens of claim 1 wherein the total internal reflection prism includes a refractive cone having a non-circular perimeter.

9. The dual free-form lens of claim 1 wherein the total internal reflection prism is mirror-symmetrical about its axes and diagonals, thereby having free-form coordinates in repetitions of 0-45 degrees for producing a square illumination pattern.

10. The dual free-form lens of claim 1 wherein the central refractive lens and the total internal reflection prism deflect central LED light rays to render the illumination pattern annular with a darkened center.

11. The dual free-form lens of claim 1 further comprising an annular base at an intersection of the total internal reflection prism and the cavity.

12. The dual free-form lens of claim 11 further including mounting legs protruding from the annular base.

13. A monolithic optical element for producing a square illumination pattern from a hemispherical light pattern-emitting LED, comprising:
    an interior cavity defined by a circular free-form surface and a quasi-conical lateral interior surface, the lateral interior surface leaning more horizontally on a diagonal of the square illumination pattern;
    the circular free-form surface and an exterior hemispherical surface defining a central refractive lens;
    the lateral interior surface, together with an upper conical surface and a quasi-conic total internal reflection surface, forming an internal reflection prism; and
    wherein the central refractive lens and the total internal reflection prism spread light azimuthally toward corners of the square illumination pattern, thereby creating substantially overlapping square illumination patterns of uniform light distribution.

14. The element of claim 13 wherein the quasi-conical lateral interior surface is mirror-symmetrical about its axes and its diagonals.

15. The element of claim 13 wherein the quasi-conical lateral interior surface has a local tilt angle adjusted point-to-point from vertical as it enters the total internal reflection prism.

16. The element of claim 13 wherein the upper conical surface and a quasi-conic total internal reflection surface have straight line profiles.

17. The element of claim 13 wherein the internal reflection prism has a non-circular perimeter.

* * * * *